United States Patent Office 2,993,907
Patented July 25, 1961

2,993,907
CYANOMETHYLENE INDOLINE DERIVATIVES
Max Coenen, Gruiten, Rhineland, and Oskar Weissel, Krefeld-Uerdingen, Germany, assignors to Farbenfabriken Bayer Aktiengesellschaft, Leverkusen, Germany, a corporation of Germany
No Drawing. Filed May 19, 1958, Ser. No. 735,992
Claims priority, application Germany May 27, 1955
12 Claims. (Cl. 260—319)

This invention is concerned with new cyanomethylene indoline derivatives and with a process for the production thereof.

It is known that indoline derivatives with a reactive methylene group in the 2-position can easily be acylated or alkylated on this methylene group by the usual methods. Thus, for example, by the reaction of 1,3,3,-trimethyl-2-methylene indoline with organic acid chlorides there are obtained 1,3,3-trimethyl-2-acylmethylene indolines.

According to the invention, compounds of the general formula:

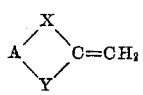

in which A is a divalent radical selected from the group consisting of:

(1) phenylene radicals substituted in 5- and 6-position by a substituent selected from the group consisting of hydrogen, chlorine, bromine, methyl, methoxy, ethoxy, methylmercapto, ethylmercapto, phenyl, nitro, and $NR_1R_2$, $R_1$ and $R_2$ being a substituent selected from the group consisting of hydrogen, methyl, ethyl, propyl, butyl, hydroxyethylene, chloroethylene, and cyanoethylene, and (2) the naphthylene radical, X is a dialkylated carbon atom with alkyl radicals selected from the group consisting of methyl, ethyl, propyl and butyl, and Y is a monosubstituted nitrogen atom, the substituent being selected from the group consisting of saturated unbranched and branched alkyl radicals up to 18 carbon atoms and the phenyl radical, can be reacted surprisingly easily even with cyanogen halides, such as cyanogen chloride, bromide and iodide, preferably in the presence of an inert solvent, with the formation of cyanomethylene indoline derivatives of the general formula:

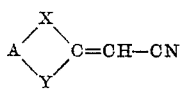

Such a type smooth reaction between cyanogen halides and heterocyclic methylene bases with the introduction of a nitrile group into the ω-position was not to be expected since it is known that cyanogen halides can act, on one hand, not only as nitrilating agents but also as halogenizing agents on compounds with active hydrogen atoms (cf. Ann., 430, 102) and since, on the other hand, it is known that tertiary amines are easily split under the influence of cyanogen halides (cf. Ber., 33, 1438).

Thus, according to the invention, there can be obtained, for example, the hitherto unknown 1,3,3,-trimethyl-2-cyanomethylene indoline by reacting 1,3,3-trimethyl-2-methylene indoline with cyanogen chloride in an inert solvent. Other suitable starting materials are, for example, 1,3,3,5-tetramethyl-2-methylene indoline,
1,3,3-trimethyl-5-methoxy-2-methylene indoline and
1,3,3-trimethyl-5-ethoxy-2-methylene indoline, furthermore
1,3-dimethyl-3-ethyl-2-methylene indoline,
1-ethyl-3,3-dimethyl-5-methoxy-2-methylene indoline,
1-octadecyl-3,3-dimethyl-2-methylene indoline,
1,3,3-trimethyl-5-phenyl-2-methylene indoline,
1,3,3-trimethyl-5-chloro-2-methylene indoline,
1,3,3-trimethyl-5-nitro-2-methylene indoline,
1,3,3-trimethyl-5-dimethylamino-2-methylene indoline,
1,3,3-trimethyl-5-methylmercapto-2-methylene indoline,
1,3,3-trimethyl-5-ethylmercapto-2-methylene indoline,
1,3,3,5,6-pentamethyl-2-methylene indoline,
1,3,3-trimethyl-2-methylene-5,6-benzo indoline and
1,3,3-trimethyl-2-methylene-6,7-benzo indoline.

Correspondingly there may be obtained:

1,3,3,5-tetramethyl-2-cyanomethylene indoline,
1,3,3-trimethyl-5-methoxy - 2 - cyano-methylene indoline, and
1,3,3-trimethyl-5-ethoxy-2-cyanomethylene indoline, furthermore
1,3-dimethyl-3-ethyl-cyanomethylene indoline,
1-ethyl-3,3-dimethyl-5-methoxy-2 - cyanomethylene indoline,
1-octadecyl-3,3-dimethyl-2-cyanomethylene indoline,
1,3,3-trimethyl-5-phenyl-2-cyanomethylene indoline,
1,3,3-trimethyl-5-chloro-2-cyanomethylene indoline,
1,3,3-trimethyl-5-nitro-2-cyanomethylene indoline,
1,3,3-trimethyl-5-dimethylamino-2-cyanomethylene indoline,
1,3,3-trimethyl-5-methylmercapto-2-cyanomethylene indoline,
1,3,3-trimethyl-5-ethylmercapto-2-cyanomethylene indoline,
1,3,3,5,6-pentamethyl-2-cyanomethylene indoline,
1,3,3-trimethyl-2-cyanomethylene-5,6-benzo indoline and
1,3,3-trimethyl-2-cyanomethylene-6,7-benzo indoline.

In general, it is advantageous to use approximately 2 moles of the indoline compound for each mole of the cyanogen halide in order to combine one mol of the indoline with the liberated hydrogen halide.

On the other hand, it is not necessary to use an excess of the indoline to bind the liberated hydrogen halide. It is also possible to add acid binding agents for neutralising the hydrogen halide. Suitable acid binding agents are for instance inorganic bases such as alkali metal and alkaline earth metal hydroxides, for instance sodium, potassium, calcium and barium hydroxide, alkali metal and alkaline earth metal salts of weak acids, such as sodium, potassium, calcium, and barium carbonate, bicarbonate, phosphate and borate, furthermore organic bases, such as tertiary amines, for instance trimethyl amine, triethyl amine, dimethyl and diethyl aniline.

Suitable solvents are, for example, aromatic hydrocarbons, such as benzene and toluene, aliphatic hydrocarbons, such as petroleum ether and ligroin, cycloaliphatic hydrocarbons, such as cyclohexane and methylcyclohexane, aliphatic, araliphatic and aromatic ethers, as well as chlorinated aliphatic and aromatic hydrocarbons, such as chloroform and chlorobenzene.

In many cases, the reaction even proceeds at room temperature. In other cases, a certain increase in temperature of, for example, 40° to about 80–100° C., can be of advantage.

The new compounds are important intermediates for the synthesis of dyestuffs. Thus they may be condensed with o-formic acid esters to cyanine dyestuffs, for instance 1,3,3-trimethyl-2-cyanomethylene indoline may be reacted with o-ethyl formate to a reddish orange dyestuff, usable as sensibilisator of silver halogen emulsions.

The following examples are given with the purpose in illustrating the invention:

Example 1

A solution of 50 grams cyanogen chloride in 730 millitres benzene is added dropwise with stirring at 50-55° C. within about 100 minutes to a solution of 294 grams 1,3,3-trimethyl-2-methylene indoline in 450 millilitres benzene and subsequently stirred for further 3 hours at 60-65° C. After cooling down, the precipitate which separates out is separated off, taken up in 1000 millilitres water and shaken up with benzene. The combined benzene solutions are subsequently washed with water. The crystalline mass which remains behind after the removal of the benzene is recrystallised from 700 millilitres ligroin with the addition of activated carbon. In this way, there is obtained 1,3,3-trimethyl-2-cyanomethylene indoline (I) in a form of colourless crystals which melt at 120° C. Yield: 140 grams (87.5 percent of theory).

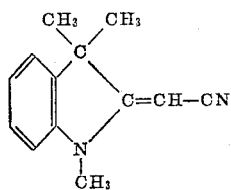  I

*Analysis.*—$C_{13}H_{14}N_2$.—Calculated: C=78.8%; H=7.13%; N=14.15%. Found: C=78.5%; H=7.15%; N=14.46%.

Example 2

A solution of 26.5 grams cyanogen bromide in 400 millilitres benzene is added dropwise with stirring at 60° C. within about 180 minutes to a solution of 86.5 grams 1,3,3-trimethyl-2-methylene indoline in 400 millilitres benzene and subsequently stirred for further 210 minutes at 60° C. After cooling down, the precipitate which separates out is separated off, the filtrate shaken up with a half-concentrated solution of hydrochloride acid and then neutralised. The grossy mass which remains behind after the removal by distillation of the solvent solidifies to almost colourless crystals by stirring with ligroin. Yield: 38 grams (70 percent of theory). Melting point after recrystallization from ligroin 118° C.

The product is identical with the 1,3,3-trimethyl-2-methylene indoline prepared according to Example 1.

Example 3

A solution of 37.8 grams cyanogen chloride in 400 millilitres methyl cyclohexane is added dropwise with stirring in a course of 2½ hours to a solution of 305 grams 1,3,3-trimethyl-5-methoxy-2-methylene indoline in 350 milliliters methyl cyclohexane. The reaction mixture is subsequently stirred for a further hour at 55° C., then boiled up for a short time with activated carbon and filtered while still hot. The residue is treated several times with hot methylcyclohexane in the same manner. 1,3,3-trimethyl-5-methoxy-2-cyanomethylene indoline (II) precipitates out as well formed crystals by cooling the combined methyl-cyclohexane solution. Melting point 123° C. Yield: 81 grams (47.3 percent of theory).

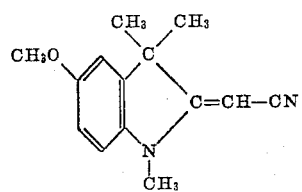  II

*Analysis.*—$C_{14}H_{16}N_2O$.—Calculated: C=73.62%; H=7.08%; N=12.28%; O=7.02%. Found: C=73.64%; H=7.35%; N=12.31%; O=7.07%.

Example 4

Into a 2-phase mixture of 156.7 grams 1,3,3-trimethyl-5-methoxy-2-methylene indoline, 284 grams benzene and 100 millilitres water there are dropped at 75° C. under stirring in the course of about 300 minutes simultaneously a solution of 61.1 grams cyanogen chloride in 730 grams benzene and 840 grams of a 4.6 percent caustic soda solution. After the addition of these agents the mixture is stirred for further 30 minutes. Then the benzene layer is separated, the benzene distilled off and the residue mixed with 100 millilitres isopropanol. After cooling there is obtained a crystal pulp which is separated and washed with a little petroleum ether. One obtains the 1,3,3-trimethyl-5-methoxy-2-cyanomethylene indoline as big colourless crystals. Yield: 160 grams (91 percent of theory). Melting point: 123° C.

Example 5

Into a 3-phase mixture of 156.7 grams 1,3,3-trimethyl-5-methoxy-2-methylene indoline, 200 millilitres benzene, 500 millilitres water and 36 grams calcium hydroxide there is added at 75° C. under stirring in the course of 270 minutes a solution of 50 millilitres cyanogen chloride in 900 millilitres benzene. Then there is continued as described in Example 4. One obtains the 1,3,3-trimethyl-5-methoxy-2-cyanomethylene indoline as colourless crystals. Yield: 154 grams (87.5 percent of theory). Melting point: 123° C.

Example 6

A solution of 50 millilitres cyanogen chloride in 900 millilitres benzene is added dropwise with stirring at 60° C. in the course of 4 hours to a solution of 380 grams 1,3,3,5-tetramethyl-2-methylene indoline in 500 millilitres benzene and then worked up in a manner described in Example 1. 1,3,3,5-tetramethyl-2-cyanomethylene indoline (III) is obtained as colourless crystals. Melting point: 149-150° C. Yield: 98 grams (47.5 percent of theory).

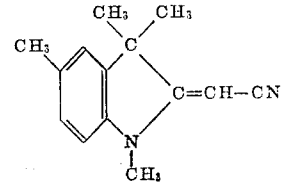  III

*Analysis.*—$C_{14}H_{16}N_2$.—Calculated: C=79.21%; H=7.59%; N=13.20%. Found: C=79.42%; H=7.72%; N=12.80%.

Example 7

Into a 2-phase mixture of 126.5 grams 1,3,3,5-tetramethyl-2-methylene indoline, 250 millilitres benzene, 81 grams sodium bicarbonate and 1000 millilitres water there is dropped at 55-60° C. under stirirng in the course of 270 minutes a solution of 50 millilitres cyanogen chloride in 900 millilitres benzene. The mixture is then stirred for further 1 hour. The benzene layer is separated. The crystal mass remaining after distilling off the benzene is recrystallized in methyl cyclohexane. One obtains the 1,3,3,5-tetramethyl-2-cyanomethylene indoline as a weakly rose-coloured crystal mass. Yield: 114 grams (79 percent of theory). Melting point: 145° C.

Example 8

Into a solution of 167 grams 1,3,3-trimethyl-5-chloro-2-methylene indoline in 450 millilitres benzene there is dropped at 65° C. under stirring in the course of about 300 minutes a solution of 23 millilitres cyanogen chloride in 400 millilitres benzene. The mixture is then stirred at 65° C. for about 100 minutes. The reaction mixture is worked up as described in Example 1. One obtains the 1,3,3-trimethyl-5-chloro-2-cyanomethylene indoline as colourless crystals. Yield: 56.5 grams (77.3 percent of theory). Melting point: 142–143° C.

*Analysis.* — $C_{13}H_{13}N_2Cl$. — Calculated: C=67.09%; H=5.63%; N=12.04%; Cl=15.24%. Found: C=67.11%; H=5.66%; N=11.69%; Cl=15.3%.

Obviously many modifications and variations of the present invention are possible in the light of the above teachings. It is, therefore, to be understood that within the scope of the appended claims the invention may be practiced otherwise than as specifically described.

We claim:

1. Process for the production of cyanomethylene indoline derivatives of the general formula

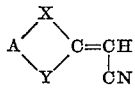

in which A is a member of the class consisting of:

(1) phenylene radicals substituted in 5- and 6-position by a member of the class consisting of hydrogen, chlorine, bromine, methyl, methoxy, ethoxy, methylmercapto, ethylmercapto, phenyl, nitro; and $NR_1R_2$, $R_1$ and $R_2$ being a member of the group consisting of hydrogen, methyl, ethyl, propyl, butyl, hydroxyethylene, chloroethylene, and cyanoethylene, and (2) the naphthylene radical, X is a dialkylated carbon atom with alkyl radicals selected from a member of the class consisting of methyl, ethyl, propyl, and butyl, and Y is a monosubstituted nitrogen atom, the substituent being selected from a member of the class consisting of saturated unbranched and branched alkyl radicals up to 18 carbon atoms and the phenyl radical, comprising reacting a 2-methylene indoline derivative of the general formula

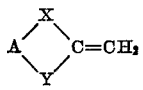

with a cyanogen halide, said reaction being carried out at a temperature of between about 40° to about 100° C.

2. Process according to claim 1, wherein the indoline starting material is 1,3,3-trimethyl-2-methylene indoline.

3. Process according to claim 1 wherein the cyanogen halide is cyanogen chloride.

4. Process according to claim 1 wherein the cyanogen halide is cyanogen bromide.

5. Process according to claim 1 wherein the molar ratio of the indoline starting material and the cyanogen halide is 2:1.

6. Process according to claim 1 wherein acid binding agents selected from the group consisting of alkali and earth alkali metal hydroxides are used.

7. Process according to claim 1 wherein acid binding agents selected from the group consisting of alkali and earth alkali metal salts of weak acids are used.

8. Process according to claim 1 wherein the reaction is carried out in the presence of an inert solvent.

9. Process according to claim 8 wherein the inert solvent is selected from the group consisting of benzene, toluene, petroleum ether, ligroin, cyclohexane, methylcyclohexane, chloroform and chlorobenzene.

10. Process according to claim 1 wherein the indoline starting material is 1,3,3,5-tetramethyl-2-methylene indoline.

11. Process according to claim 1, wherein the indoline starting material is 1,3,3-trimethyl-5-methoxy-2-methylene indoline.

12. Process according to claim 1, wherein the indoline starting material is 1,3,3-trimethyl-5-chloro-2-methylene indoline.

References Cited in the file of this patent

UNITED STATES PATENTS

| 2,188,104 | Baumann et al. | Jan. 23, 1940 |
| 2,728,778 | Speeter | Dec. 27, 1955 |

FOREIGN PATENTS

| 620,802 | Great Britain | Mar. 30, 1949 |